United States Patent
Koester et al.

(10) Patent No.: US 12,118,342 B2
(45) Date of Patent: Oct. 15, 2024

(54) APPLYING A CODE UPDATE TO A TARGET SYSTEM FROM A PERSONAL COMMUNICATION DEVICE

(71) Applicant: INTERNATIONAL BUSINESS MACHINES CORPORATION, Armonk, NY (US)

(72) Inventors: Michael Koester, Hollister, CA (US); Kevin L. Miner, Lake City, FL (US); Trinh Nguyen, San Jose, CA (US); Camvu Pham, San Jose, CA (US)

(*) Notice: Subject to any disclaimer, the term of this patent is extended or adjusted under 35 U.S.C. 154(b) by 193 days.

(21) Appl. No.: 17/242,762

(22) Filed: Apr. 28, 2021

(65) Prior Publication Data

US 2022/0350585 A1    Nov. 3, 2022

(51) Int. Cl.

| | |
|---|---|
| *G06F 9/445* | (2018.01) |
| *G06F 3/0481* | (2022.01) |
| *G06F 8/61* | (2018.01) |
| *G06F 8/65* | (2018.01) |
| *H04L 9/40* | (2022.01) |
| *H04L 29/08* | (2006.01) |
| *H04L 67/00* | (2022.01) |

(52) U.S. Cl.
CPC .................. *G06F 8/65* (2013.01); *G06F 8/61* (2013.01); *H04L 63/0838* (2013.01); *H04L 67/34* (2013.01)

(58) Field of Classification Search
CPC . G06F 8/61; G06F 8/65; H04L 3/0838; H04L 67/34
See application file for complete search history.

(56) References Cited

U.S. PATENT DOCUMENTS

| | | | | |
|---|---|---|---|---|
| 11,416,587 | B1* | 8/2022 | Den Hartog | G06F 8/61 |
| 2014/0181801 | A1* | 6/2014 | Voronkov | G06F 8/61 |
| | | | | 717/177 |
| 2016/0162172 | A1* | 6/2016 | Rathod | G06F 3/04847 |
| | | | | 715/747 |
| 2018/0115896 | A1* | 4/2018 | Chow | G06F 21/629 |
| 2021/0243184 | A1* | 8/2021 | La Torre | H04W 12/06 |

FOREIGN PATENT DOCUMENTS

| | | |
|---|---|---|
| CN | 103473627 A | 12/2013 |
| CN | 109376223 A | 2/2019 |
| CN | 109670805 A | 4/2019 |

(Continued)

*Primary Examiner* — S. Sough
*Assistant Examiner* — Mohammad H Kabir
(74) *Attorney, Agent, or Firm* — Konrad, Raynes, Davda & Victor LLP; David Victor (57) ABSTRACT

Provided are a computer program product, system, and method for applying a code update to a target system from a personal communication device. A code update command is received from a messaging application, executing on the personal communication device of the user, indicating a code update to install on the target system a code update maintained in the target system. The code update command is processed to extract indication of the code update to install and a target system user identifier of the target system on which to install the code update. At least one job is generated to install the code update on the target system. The at least one job is transmitted to the target system to cause the target system to process the at least one job to install the code update.

17 Claims, 7 Drawing Sheets

(56) References Cited

FOREIGN PATENT DOCUMENTS

| | | |
|---|---|---|
| CN | 109697159 A | 4/2019 |
| KR | 101632903 B1 | 6/2016 |
| KR | 102087285 B1 | 2/2020 |
| WO | 2014175382 | 10/2014 |
| WO | 2017086772 | 5/2017 |

\* cited by examiner

_APPLYING A CODE UPDATE TO A TARGET SYSTEM FROM A PERSONAL COMMUNICATION DEVICE_

BACKGROUND OF THE INVENTION

Field of the Invention

The present invention relates to a computer program product, system, and method for applying a code update to a target system from a personal communication device.

Description of the Related Art

A systems programmer or administrator may receive a report, such as an Authorized Program Analysis Report (APAR), identifying problems with code in an enterprise system that requires a code update, such as a program temporary fix (PTF). This process requires the administrator to manually install PTFs to enterprise systems. The systems administrator will typically operate from a terminal or computer connected to the enterprise system to which the PTF will be applied.

There is a need in the art for improved techniques and infrastructure to allow a system administrator to apply code updates to an enterprise computing environment.

SUMMARY

Provided are a computer program product, system, and method for applying a code update to a target system from a personal communication device. A code update command is received from a messaging application, executing on the personal communication device of the user, indicating a code update to install on the target system a code update maintained in the target system. The code update command is processed to extract indication of the code update to install and a target system user identifier of the target system on which to install the code update. At least one job is generated to install the code update on the target system. The at least one job is transmitted to the target system to cause the target system to process the at least one job to install the code update.

DETAILED DESCRIPTION

For administrators and system programmers, the need to apply maintenance can come at any time, such as a problem that requires an immediate application of code or a PTF to an enterprise or mission critical system. However, at the time of such critical need for a code update, the systems programmer may not have access to a laptop or terminal connected to the systems to apply the code update or PTF. Because most personnel always maintain a personal communication device, such as a smartphone or tablet, described embodiments provide an infrastructure to allow an administrator, including system programmers, to access the enterprise system they manage and apply maintenance, such as code updates, to the systems via their personal communication device. Administrators may also use personal communication devices to check if a prerequisite and/or co-requisite code update has been applied to the system, and if not also apply that code update, e.g., PTF. The administrator may also use their personal communication device to perform initial program loading (IPL) and verify that the code updates have been installed correctly.

Figure 1:
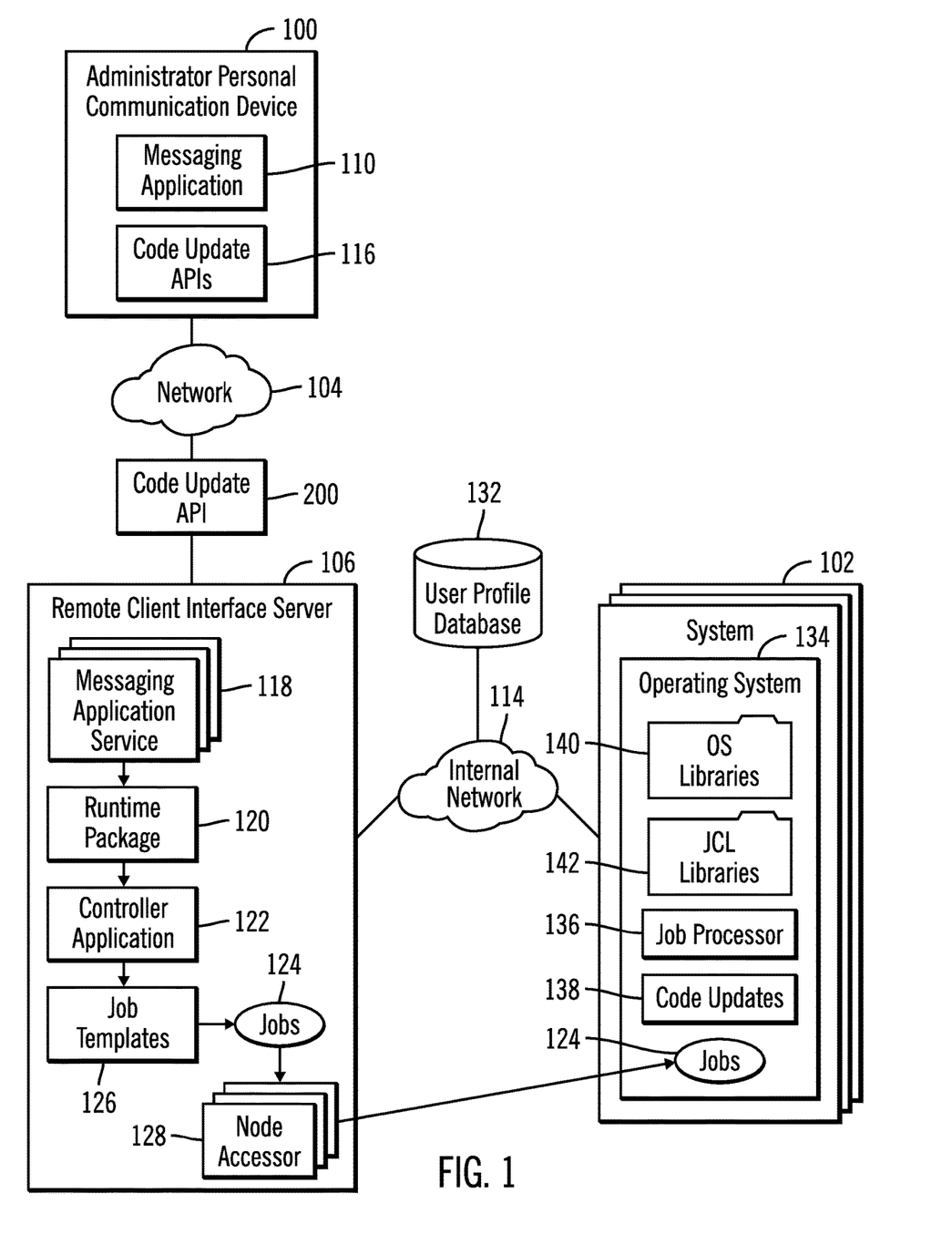
FIG. 1 illustrates an embodiment of a code update computing environment.

FIG. 1 illustrates an embodiment of a computing environment in which a user, such as an administrator or systems programmer, at a personal communication device 100, can apply code updates to one or more systems 102. The personal communication device 100 may comprise a portable computing device, such as a smartphone, tablet, wearable computer, computer glasses, etc. The personal communication device 100 communicates over a network 104 with a remote client interface server 106 having a message application service 118 to receive messaging application 110 queries and commands, in the form of one or more code update APIs 200. The remote client interface server 106 further includes a controller application 122 to generate jobs 124 to apply the code update specified in the code update APIs 200 to transmit over an internal network 114 to one or more systems 102 to apply the code update.

The administrator personal communication device 100 includes a messaging application 110 used to send messages and queries, such as a messenger application, business communication platform, such as SLACK®, and a plugin-module of code update APIs 116, which allow communication of commands 200 to install code updates to the remote client interface server 106. (SLACK is a registered trademark of Slack Technologies throughout the world). The plug-in module of code update APIs 116 may also include commands to allow the user of the personal communication device 100 to query the remote client interface server 106 for status of code levels and updates at the systems 102.

The remote client interface server 106 includes multiple messaging application services 118 to interface with different client messaging applications 110, a runtime package 120 to implement a runtime environment on which the controller application 122 executes to process the received code update API 200 to generate one or more jobs 124 from job templates 126, and a node accessor 128 instantiated for each system 102 to communicate the generated jobs 124 to the system 102 over an internal network 114. The controller application 122 or other component in the remote client interface server 106 may interface with a user profile database 132 over the internal network 114 to obtain user information to authenticate the communications from the messaging application 110 and provide credentials to authenticate the personal communication device to send the jobs 124 to the systems 102.

Each of the systems 102 includes an operating system 134 and job processor 136 to process the jobs 124 that are received to apply code updates 138 to the operating system 134 or other hardware or software component of the system 102. The job processor 136 may utilize operating system libraries 140 and Job Control Language (JCL) libraries 142, when the jobs 124 are implemented as job control language (JCL) statements, to process the jobs 124 to install an identified code update 138 locally accessible to the system 102. In this way, the administrator at the personal communication device 100 does not supply the code update 138, but submits commands to have an identified code update 138 installed.

In one of many possible implementation, the operating system 134 may comprise the z/OS® operating from International Business Machines Corporation ("IBM"), the messaging application service 118 may comprise a sub-application that sends the input from the code update API 112 to the runtime package 120. The runtime package 120 may comprise a NODE.JS® package, which sends the code update API 200 inputs to the controller application 122 that executes in the runtime node package (Node.js) 120 environment. The generated jobs 124 may comprise JCL program statements. The code updates 138 to apply may comprise Program Temporary Fixes (PTFs). In alternative embodiments, different coding implementations may be used for the components of the remote client interface server 106. (IBM and z/OS are registered trademarks of International Business Machines Corporation throughout the world; NODE.JS is a registered trademark of Joyent, Inc. throughout the world).

Generally, program modules, such as the program components 110, 116, 118, 120, 122, 124, 136 138, 140, 142 may comprise routines, programs, objects, components, logic, data structures, and so on that perform particular tasks or implement particular abstract data types. The program components of FIG. 1 may be implemented in one or more computer systems, where if they are implemented in multiple computer systems, then the computer systems may communicate over a network The programs 110, 116, 118, 120, 122, 124, 136 138, 140, 142 may comprise program code loaded into memory and executed by a processor. Alternatively, some or all of the functions may be implemented in hardware devices, such as in Application Specific Integrated Circuits (ASICs) or executed by separate dedicated processors.

In FIG. 1, arrows are shown between components. These arrows represent information flow to and from the program components and do not represent data structures.

In FIG. 1, the networks 104 and 114 comprise separate networks, where the network 104 may comprise the Internet and the network 130 may comprise a Storage Area Network (SAN), Local Area Network (LAN), Intranet, the Internet, Wide Area Network (WAN), peer-to-peer network, wireless network, arbitrated loop network, etc. In alternative embodiments, the networks 104 and 114 may be implemented as a single network or more than two networks.

In FIG. 1, the remote client interface server 106 is shown as implemented in a separate server from the systems 102 to which the code update will be applied. In alternative embodiments, the remote client interface server 106 components may be implemented in one or more of the systems 102 to which code updates are applied.

Figure 2:
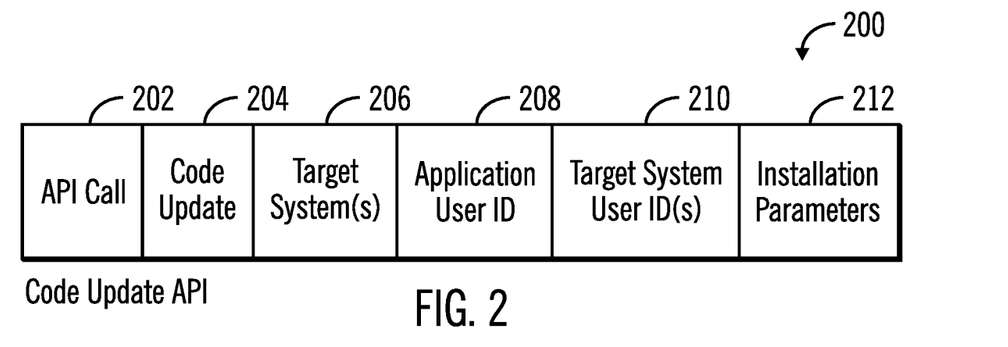
FIG. 2 illustrates an embodiment of a code update Application Programming Interface (API) command.

FIG. 2 illustrates an embodiment of a code update API 200, including an API call 202; the code update 204 to apply; one or more target systems 206, identifying systems 102, on which to apply the code update 204; an application user identifier (ID) 208 of the user initiating the request from their messaging application 110; one or more target system user ID(s) 210 used to authenticate the user 208 of the messaging application 110 with the target system(s) 206 on which to install the code update 204; and installation parameters 212 to control the installation of the code update 138 on the system 102 operating system 134, such as pre-requirements that must be checked and applied, hold data requiring action taken when applying the code update, e.g., PTF, such as an initial program loading (IPL) to restart, a restart of an address space, a dynamic refresh of the program after the PTF(s) have been installed, scheduling requirements for the updates, etc.

In one embodiment, the application user ID 208 and target system user ID(s) 210 may comprise a single identity, such as an IBM® W3 ID, that is used to authenticate the application user ID 208 across an enterprise.

Figure 3:
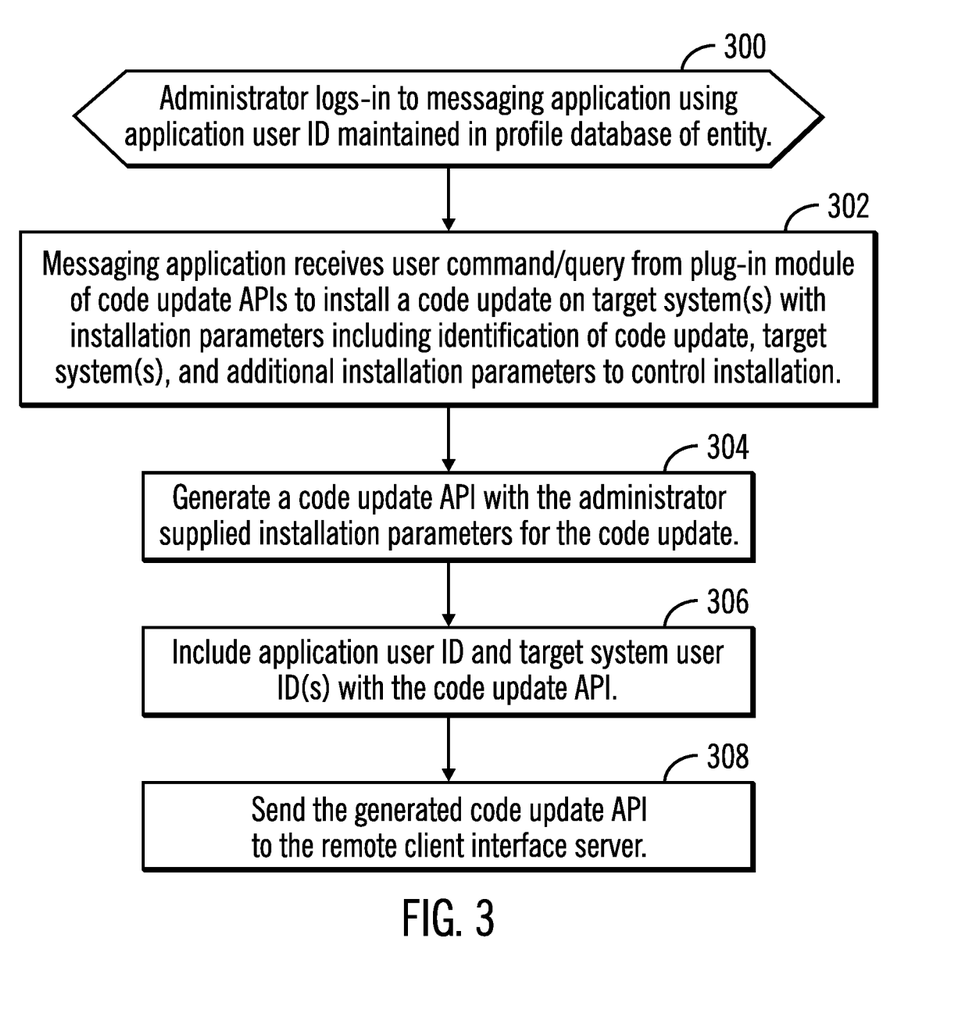
FIG. 3 illustrates an embodiment of operations performed by a personal communication device to send a code update API to a server to apply the code update.

FIG. 3 illustrates an embodiment of operations performed by the messaging application 110 to process a user command to install a code update 138 in a system 102. After the administrator logs-in (at block 300) to the messaging application 110, using an application user ID 208, which is included in a messaging application profile for the user in the profile database 132, the messaging application 110 receives a user command/query from a plug-in module of code update APIs 116 to install a code update 138 on a system 102. The user command may further include installation parameters including the selected API call 202, identification of the code update 204 to apply, one or more target system(s) 206 on which to apply the code update 204, and additional installation parameters 212 to control installation of the code update 204 and pre and post installation steps. The messaging application 110 generates (at block 304) a code update API 200 with the administrator supplied installation parameters 202, 204, 206, 212. The messaging application 110 may include (at block 306) the user ID 208 and target system user ID(s) 210, encrypted, in the code update API 200. The generated code update API 200 is sent (at block 308) to the remote client interface server 106.

With the embodiment of FIG. 3, the administrator, using a personal communication device 100 and general messaging application 110 on their personal communication device 100, may select a command from a plug-in module of code update APIs 116 and remotely cause code updates 138 to be applied and installed at the target systems 102.

Figure 4A:
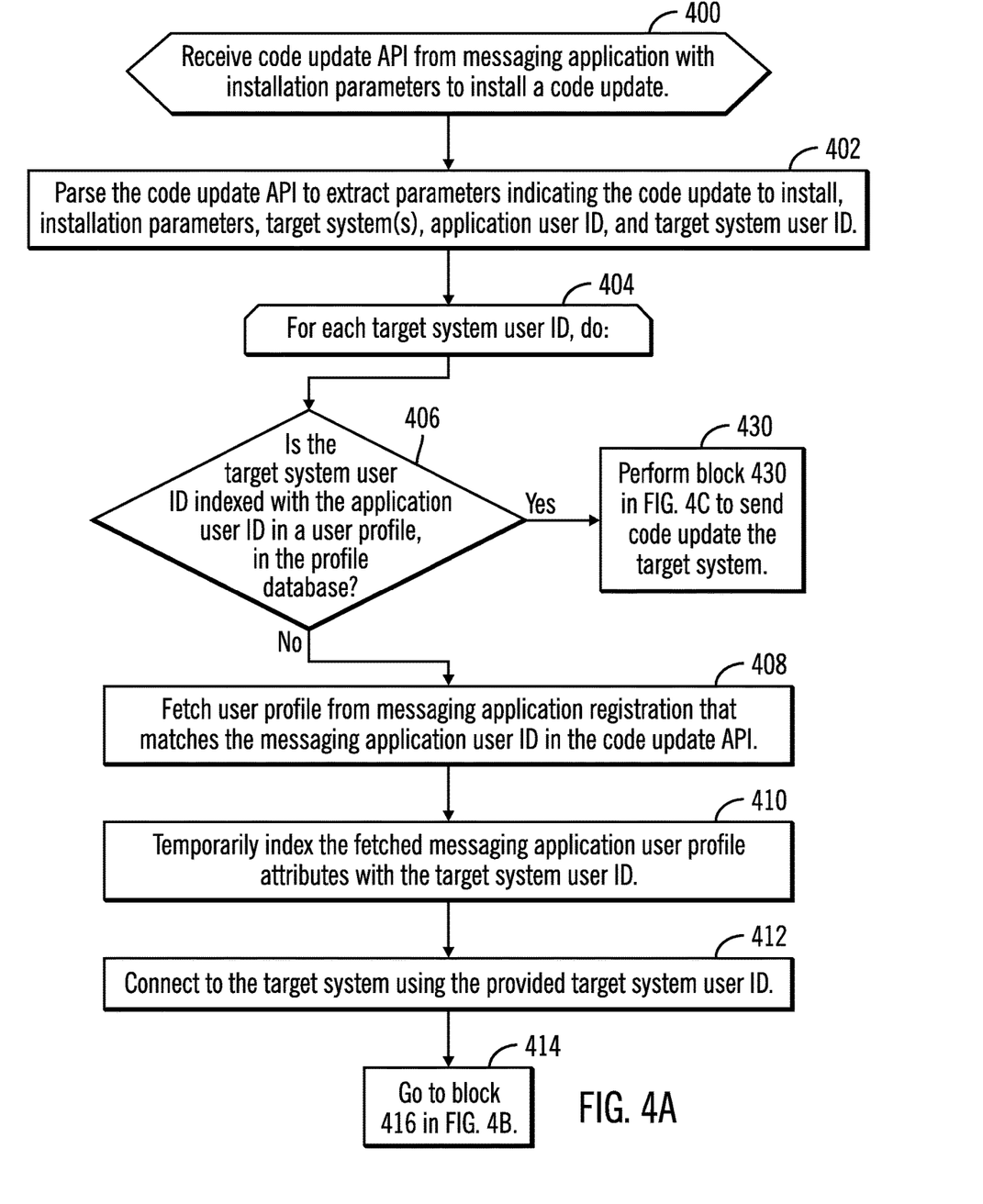
FIGS. 4*a*, 4*b*, and 4*c* illustrate an embodiment of operations to apply a code update specified in a code update API from a personal communication device to one or more target systems in an enterprise computing environment.
Figure 4B:
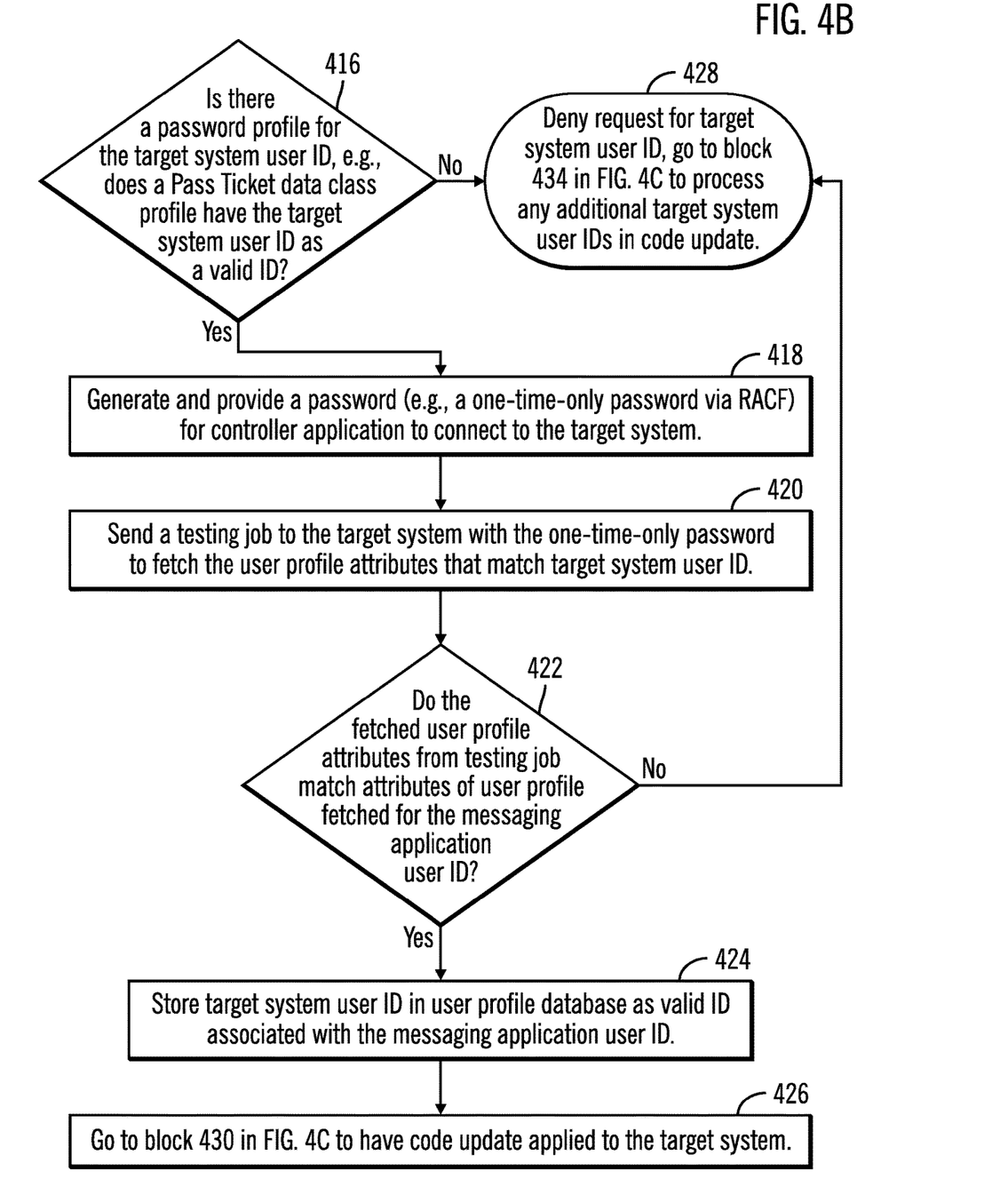
Figure 4C:
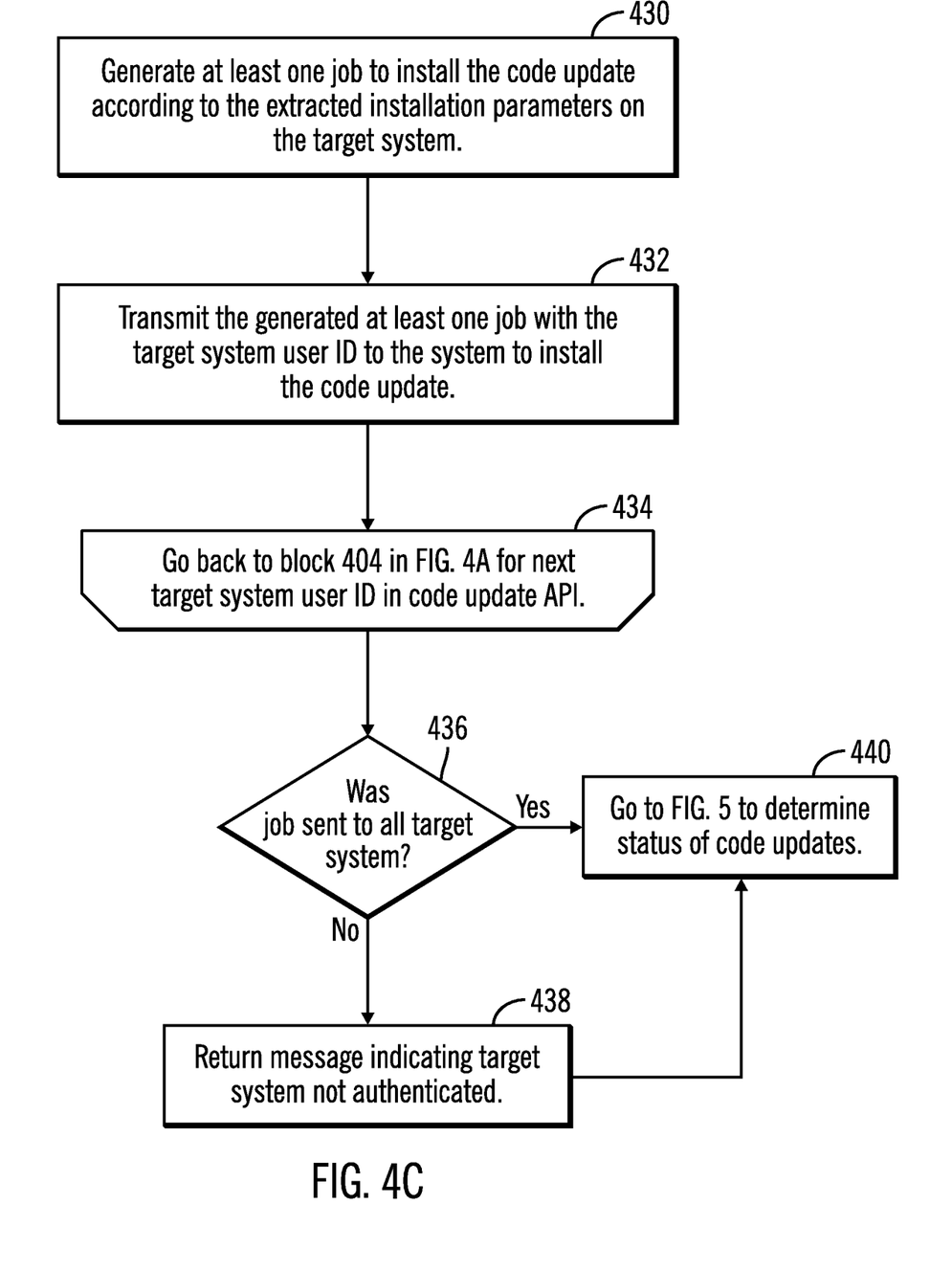

FIGS. 4a, 4b, and 4c illustrate an embodiment of operations performed by the messaging application service 118, the controller application 122, and node accessor 128 to generate one or more jobs 124 from the code update API 200 sent from the message application 110. Upon the messaging application service 118 receiving (at block 400) a code update API 200 from the messaging application 110 with installation parameters to install a code update 204, the input from the code update API 200 is passed to the controller application 122 to parse (at block 402) the API code update 200 to extract the parameters indicating the code update 204 to install, installation parameters 212, target system(s) 206, application user ID 208, and the target system user ID 210. For each target system user ID 210 included in the code update API 200, the controller application 122 performs a loop of operations at blocks 404 through 442.

The controller application 122 determines (at block 406) whether the target system user ID 210 is indexed with the application user ID 208 in a user profile in the user profile database 132. If so, control proceeds to block 430 in FIG. 4c to proceed with the code update. If not index, the controller application 122 initiates a process at block 408 et seq. to attempt to associate the application user ID 208 with the target system user ID 210 in the profile database 132. At block 408, a user profile in the user profile database 132 is fetched from messaging application registration that matches the messaging application user ID 208 in the code update API 200. The fetched messaging application user profile attributes are temporarily indexed (at block 410) with the target system user ID 210. The controller application 122 connects (at block 412) to the target system 102 using the provided target system user ID 210.

At block 414 control proceeds to block 416 in FIG. 4b, where the controller application 122 determines whether there is a password profile for the target system user ID 210. In an implementation using IBM® Resource Access Control Facility (RACF®) PassTicket, the determination at block 416 is performed by determining whether there is a PassTicket data class profile having the target system user ID 210 as a valid identifier. If (at block 416) there is a valid password profile for the target system user ID 210, then a password is generated and provided (at block 418) for the controller application 122 to connect to the target system 102. In PassTicket implementations, the RACF generates a one-time only password for the controller application 122 to use to connect to the target system 102. The controller application 122 may send (at block 420) a testing job to the target system 102 with the one-time-only password to fetch the user profile attributes that match target system user ID 210. Other techniques may be used to fetch the user profile attributes for the target system user ID 210.

If (at block 422) the fetched user profile attributes from the testing job match the attributes of the user profile fetched for the message application user ID (at block 408), then the target system user ID 210 is stored (at block 424) in the user profile database 132 as a valid ID associated with the messaging application user ID 208. At block 426, control proceeds to block 430 in FIG. 4c to have the target system 102 apply the code update 204. If (at block 422) the fetched user profile attributes did not match attributes for the message application user ID or if (at block 416) there is no password profile for the target system user ID 210, then the request to apply the code update 204 at the target system 102 is denied (at block 428) and control proceeds to block 434 in FIG. 4c for further processing.

At block 430 in FIG. 4c, the controller application 122 generates at least one job 124 to install the identified code update 204 according to the extracted installation parameters 212 on the target system 206. The node accessor 128 for the system 102 transmits (at block 432) the generated at least one job 124 with the target system user ID 210 to the system 102 to install the code update 138. Control then goes back (at block 434) to block 404 in FIG. 4a to process the next target system user ID 210 for the next target system 102 to update. After processing all target system user IDS 210 in the code update API 200 (at block 434), if (at block 436) the job 124 was not sent to all target system(s) 206 identified in the code update API 200, such as the case if not all the target system user IDs 210 able to authenticate with all target systems 206, then the messaging application service 118 returns (at block 438) a message to the administrator personal communication device 100 identifying the target systems 102 not updated. After returning the reply (at block 438) or if (from the yes branch of block 436) of the job 124 was sent to all target systems 206, then control proceeds (at block 440) to FIG. 5 to determine the status of code updates.

With the embodiment of FIGS. 4a, 4b and 4c, a server 106 receiving a code update API 200 from a personal communication device 100 of an administrator authenticates the user using both an identifier supplied for the target system and an identifier for the messaging application on the personal communication device 100. Further, if the user profile database does not associate the target system user ID 210 with the messaging application user ID 208, then the remote client interface server 106 will use the user IDs 208, 210 to gather information from the profile database to log into the target system, such as using a one-time password, to determine whether use profile attributes at the target system match fetched attributes of the messaging application user ID to create the association of the target system user ID 210 and the messaging application user ID 208 in the profile database 132 to use for subsequent accesses by the remote user using the messaging application 110. This allows for creation of the appropriate credentials if the association of the target system user ID and application user ID has not yet been established with the user profile. This technique can be used to automatically install a code update 138, specified in the API 200 communicated on the personal communication device 100, on all target systems specified in the code update API. In this way, the administrator has the convenience of applying a code update 138 maintained in the target system 102 remotely using a personal communication device 100 and common messaging application 110 in a secure manner by having the controller application 122 perform the authentication and transmission of an update job 124 to all specified systems.

Figure 5:
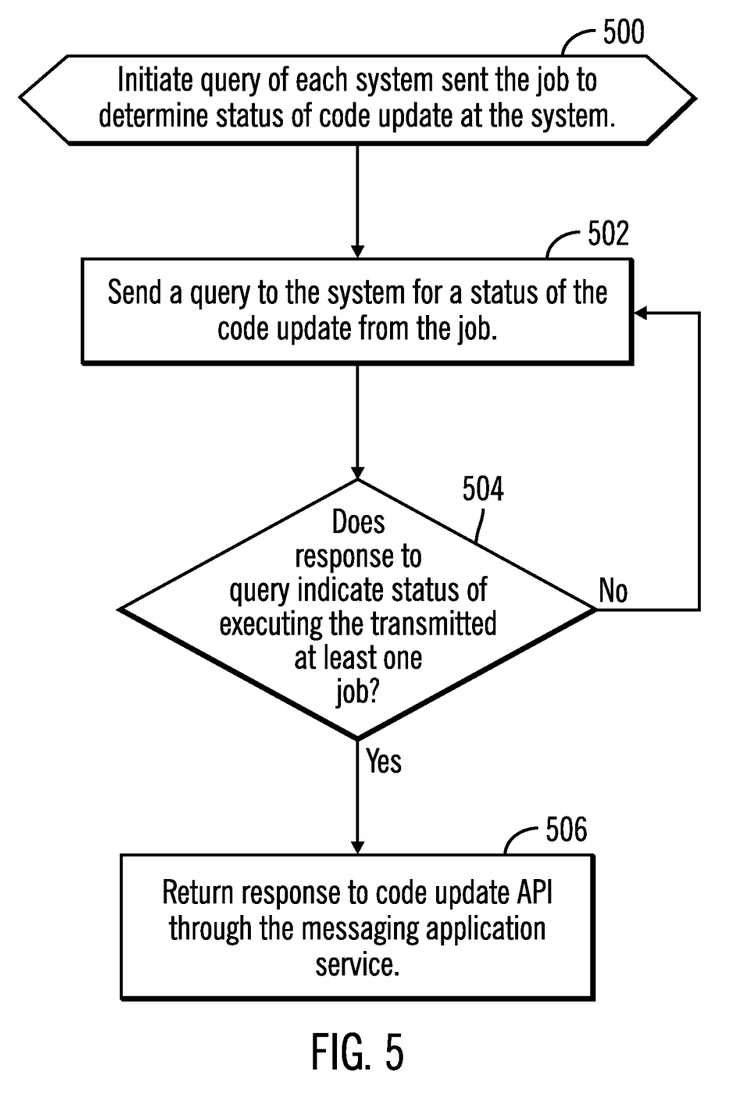
FIG. 5 illustrates an embodiment of operations to query target systems for a status of applying a code update.

FIG. 5 illustrates an embodiment of operations performed by the node accessors 128 that sent the jobs 124 to the target systems 102 to determine the status of the systems 102 applying the code update 138 specified in the jobs 124. The node accessors 128 may initiate (at block 500) a loop query of each system 102 to which the job 124 was sent and send (at block 502) a query to the system 102 for a status of the code update from the job 124. If (at block 504) a response to the query indicates status of executing the transmitted job 124, then that response is returned (at block 506) to the code update API 200 through the messaging application service 118. If (from the no branch of block 504) a response to the query is not received, then the node accessor 128 continues to loop the query (at block 502) query until a response is received on the status of executing the sent job 124. The messaging application service 118 may consolidate the results of the code update API 200 for all target systems 206 before sending a reply on the status to the messaging application 110.

With the embodiment of FIG. 5, the node accessors 128 that sent the jobs 124 to the systems 102 loop the result querying to fetch the job output until a result is received. In certain embodiments, the node accessor 128 may go to a held queue list (MESSAGE=H for the JCL job 124) to fetch the job output and filter it for a compact result. The result will be returned to the controller application 122 in callback function. The controller application 122 may send the result to the messaging application service 118 as a bot API response to the code update API 200.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
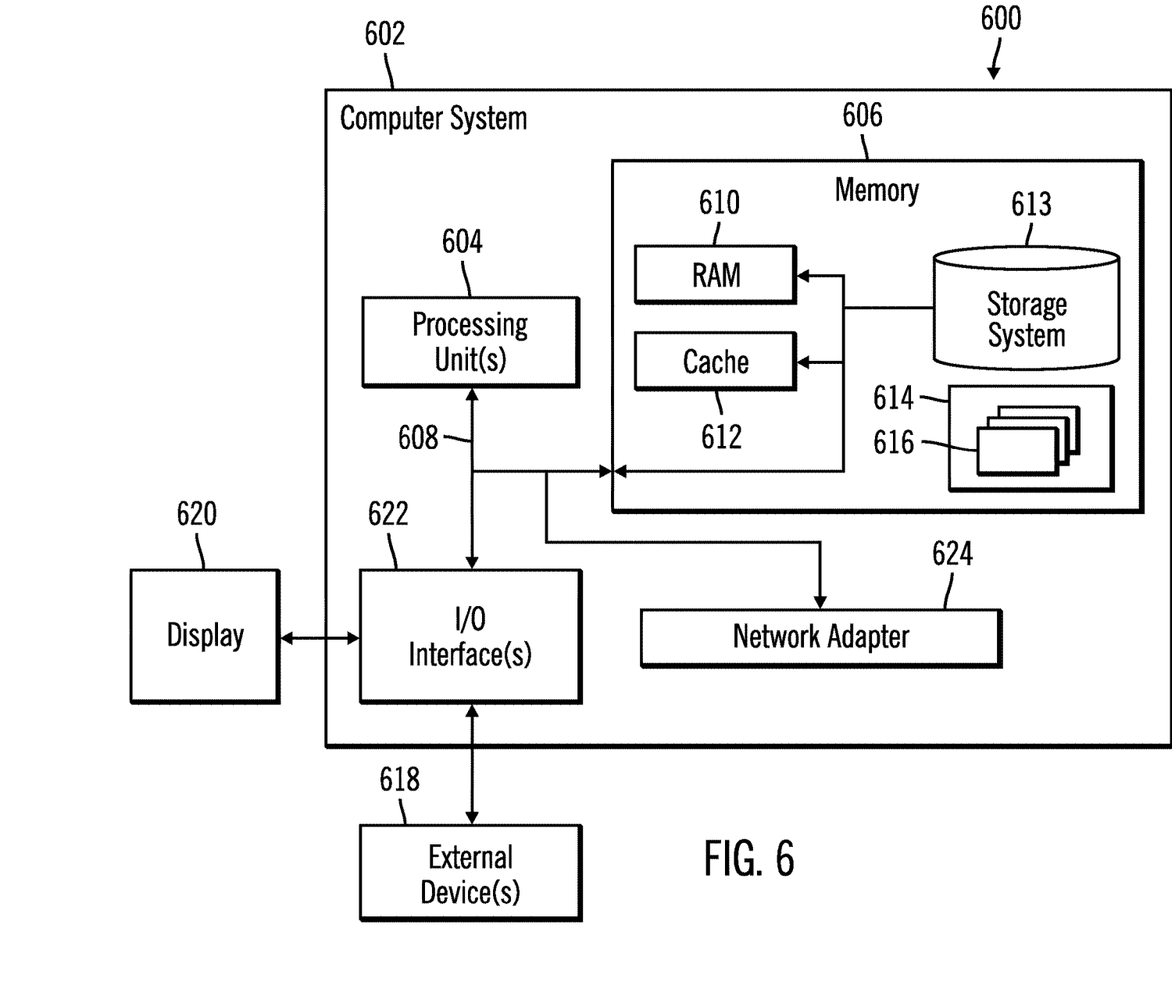
FIG. 6 depicts a computing environment in which the components of FIG. 1 may be implemented.

The computational components of FIG. 1, including the personal communication device 100, systems 102, and remote client interface server 106, may be implemented in one or more computer systems, such as the computer system 602 shown in FIG. 6. Computer system/server 602 may be described in the general context of computer system executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, the computer system/server 602 is shown in the form of a general-purpose computing device. The components of computer system/server 602 may include, but are not limited to, one or more processors or processing units 604, a system memory 606, and a bus 608 that couples various system components including system memory 606 to processor 604. Bus 608 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media.

System memory 606 can include computer system readable media in the form of volatile memory, such as random access memory (RAM) 610 and/or cache memory 612. Computer system/server 602 may further include other removable/non-removable, volatile/non-volatile computer system storage media. By way of example only, storage system 613 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 608 by one or more data media interfaces. As will be further depicted and described below, memory 606 may include at least one program product having a set (e.g., at least one) of program modules that are configured to carry out the functions of embodiments of the invention.

Program/utility 614, having a set (at least one) of program modules 616, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. The components of the computer 602 may be implemented as program modules 616 which generally carry out the functions and/or methodologies of embodiments of the invention as described herein. The systems of FIG. 1 may be implemented in one or more computer systems 602, where if they are implemented in multiple computer systems 602, then the computer systems may communicate over a network.

Computer system/server 602 may also communicate with one or more external devices 618 such as a keyboard, a pointing device, a display 620, etc.; one or more devices that enable a user to interact with computer system/server 602; and/or any devices (e.g., network card, modem, etc.) that enable computer system/server 602 to communicate with one or more other computing devices. Such communication can occur via Input/Output (I/O) interfaces 622. Still yet, computer system/server 602 can communicate with one or more networks such as a local area network (LAN), a general wide area network (WAN), and/or a public network (e.g., the Internet) via network adapter 624. As depicted, network adapter 624 communicates with the other components of computer system/server 602 via bus 608. It should be understood that although not shown, other hardware and/or software components could be used in conjunction with computer system/server 602. Examples, include, but are not limited to, microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for installing a code update at a target system, wherein the computer program product comprises a computer readable storage medium at an interface server, in communication over the Internet with a personal communication device of a user, having computer readable program instructions executed by a processor to perform operations at the interface server, the operations comprising:

receiving, at the interface server, from a messaging application executing on the personal communication device of the user, a code update command over the Internet indicating a code update to install on the target system, a target system user identifier for the target system, and a messaging application user identifier for the messaging application, wherein the code update is maintained in the target system; and in response to the code update command transmitted from the personal communication device over the Internet, the interface server performs:

determining whether a user profile in a user profile database associates the target system user identifier and the messaging application user identifier to authenticate the user with the target system; and in response to the user profile associating the target system user identifier and the messaging application user identifier, performing:

generating at least one job to install the code update on the target system; and transmitting, over an intranet, the at least one job to the target system to cause the target system to process the at least one job to install the code update at the target system.

2. The computer program product of claim 1, wherein the intranet comprises an internal network of an entity hosting the interface server and the target system.

3. The computer program product of claim 1, wherein the user profile in the user profile database comprises a first user profile, wherein in response to the user profile from the user profile database not associating the target system user identifier and the messaging application user identifier, the operations further comprise:

fetching from the target system a second user profile for the target system user identifier;

determining whether attributes of the first user profile and the second user profile match; and storing the target system user identifier in the user profile database as a valid identifier associated with the messaging application user identifier, wherein the at least one job is transmitted to the target system in response to the storing the target system user identifier in the user profile database as the valid identifier.

4. The computer program product of claim 3, wherein in response to the user profile from the user profile database not associating the target system user identifier and the messaging application user identifier, the operations further comprise:

determining whether the target system user identifier is associated with a profile for a one-time password; and providing the one-time password to connect to the target system to perform the fetching of the second user profile in response to determining that the target system user identifier is associated with the profile for the one-time password.

5. The computer program product of claim 1, wherein the personal communication device comprises a smartphone or tablet.

6. The computer program product of claim 1, wherein the operations further comprise:

querying the target system in a loop until a result of the job to install the code update on the target system is returned; and returning the result to the messaging application as a response to the code update command.

7. The computer program product of claim 1, wherein the operations further comprise:

providing a plurality of messaging application services to interface with different messaging applications deployed in personal communication devices; and determining a messaging application service of the messaging application services to process the code update command received from the messaging application and provide content of the code update command to a controller application to parse the content of the code update command to extract parameters indicating the code update to install and installation parameters.

8. A system for installing a code update at a target system, wherein the system is in communication over the Internet with a personal communication device of a user, comprising:

a processor; and a computer readable storage medium having computer readable program instructions executed by the processor to perform operations, the operations comprising:

receiving, from a messaging application executing on the personal communication device of the user, a code update command, over the Internet, indicating a code update to install on the target system, a target system user identifier for the target system, and a messaging application user identifier for the messaging application, wherein the code update is maintained in the target system;

in response to the code update command transmitted from the personal communication device over the Internet, performing:

determining whether a user profile in a user profile database associates the target system user identifier and the messaging application user identifier to authenticate the user with the target system; and in response to the user profile associating the target system user identifier and the messaging application user identifier, performing:

generating at least one job to install the code update on the target system; and transmitting, over an Intranet, the at least one job to the target system to cause the target system to process the at least one job to install the code update at the target system.

9. The system of claim 8, wherein the user profile in the user profile database comprises a first user profile, wherein in response to the first user profile from the user profile database not associating the target system user identifier and the messaging application user identifier, the operations further comprise:

fetching from the target system a second user profile for the target system user identifier;

determining whether attributes of the first user profile and the second user profile match; and storing the target system user identifier in the user profile database as a valid identifier associated with the messaging application user identifier, wherein the at least one job is transmitted to the system in response to the storing the target system user identifier in the user profile database as the valid identifier.

10. The system of claim 9, wherein in response to the user profile from the user profile database not associating the target system user identifier and the messaging application user identifier, the operations further comprise:

determining whether the target system user identifier is associated with a profile for a one-time password; and providing the one-time password to connect to the target system to perform the fetching of the second user profile in response to determining that the target system user identifier is associated with the profile for the one-time password.

11. The system of claim 8, wherein the operations further comprise:
 querying the target system in a loop until a result of the job to install the code update on the target system is returned; and
 returning the result to the messaging application as a response to the code update command.

12. The system of claim 8, wherein the operations further comprise:
 providing a plurality of messaging application services to interface with different messaging applications deployed in personal communication devices; and
 determining a messaging application service of the messaging application services to process the code update command received from the messaging application and provide content of the code update command to a controller application to parse the content of the code update command to extract parameters indicating the code update to install and installation parameters.

13. A method for an interface server to install a code update at a target system, wherein the interface server is in communication over the Internet with a personal communication device of a user, comprising:
 receiving, at the interface server, from a messaging application executing on the personal communication device of the user, a code update command over the Internet indicating a code update to install on the target system, a target system user identifier for the target system, and a messaging application user identifier for the messaging application, wherein the code update is maintained in the target system; and
 in response to the code update command transmitted from the personal communication device over the Internet, the interface server performs:
  determining whether a user profile in a user profile database associates the target system user identifier and the messaging application user identifier to authenticate the user with the target system; and
  in response to the user profile associating the target system user identifier and the messaging application user identifier, performing:
   generating at least one job to install the code update on the target system; and
   transmitting, over an intranet, the at least one job to the target system to cause the target system to process the at least one job to install the code update.

14. The method of claim 13, wherein the user profile in the user profile database comprises a first user profile, wherein in response to the user profile from the user profile database not associating the target system user identifier and the messaging application user identifier, further comprising:
 fetching from the target system a second user profile for the target system user identifier;
 determining whether attributes of the first user profile and the second user profile match; and
 storing the target system user identifier in the user profile database as a valid identifier associated with the messaging application user identifier, wherein the at least one job is transmitted to the target system in response to the storing the target system user identifier in the user profile database as the valid identifier.

15. The method of claim 14, wherein in response to the user profile from the user profile database not associating the target system user identifier and the messaging application user identifier, further comprising:
 determining whether the target system user identifier is associated with a profile for a one-time password; and
 providing the one-time password to connect to the target system to perform the fetching of the second user profile in response to determining that the target system user identifier is associated with the profile for the one-time password.

16. The method of claim 13, further comprising:
 querying the target system in a loop until a result of the job to install the code update on the target system is returned; and
 returning the result to the messaging application as a response to the code update command.

17. The method of claim 13, further comprising:
 providing a plurality of messaging application services to interface with different messaging applications deployed in personal communication devices; and
 determining a messaging application service of the messaging application services to process the code update command received from the messaging application and provide content of the code update command to a controller application to parse the content of the code update command to extract parameters indicating the code update to install and installation parameters.

\* \* \* \* \*